(12) United States Patent
Osborne

(10) Patent No.: US 10,508,057 B2
(45) Date of Patent: Dec. 17, 2019

(54) REGENERATIVE BURNER MEDIA

(71) Applicant: Brian Osborne, Saint Louis, MO (US)

(72) Inventor: Brian Osborne, Saint Louis, MO (US)

(73) Assignee: O'Brien Asset Management, LLC, Saint Louis, MO (US)

( * ) Notice: Subject to any disclaimer, the term of this patent is extended or adjusted under 35 U.S.C. 154(b) by 234 days.

(21) Appl. No.: 15/696,607

(22) Filed: Sep. 6, 2017

(65) Prior Publication Data

US 2019/0071362 A1  Mar. 7, 2019

(51) Int. Cl.
*C04B 35/78* (2006.01)
*C09K 5/14* (2006.01)
*C04B 35/44* (2006.01)
*C04B 35/101* (2006.01)
*C04B 35/626* (2006.01)
*C04B 35/482* (2006.01)

(52) U.S. Cl.
CPC ............ *C04B 35/78* (2013.01); *C04B 35/101* (2013.01); *C04B 35/44* (2013.01); *C04B 35/482* (2013.01); *C04B 35/62665* (2013.01); *C09K 5/14* (2013.01); *C04B 2235/3201* (2013.01); *C04B 2235/3208* (2013.01); *C04B 2235/3217* (2013.01); *C04B 2235/3225* (2013.01); *C04B 2235/3232* (2013.01); *C04B 2235/3272* (2013.01); *C04B 2235/3418* (2013.01); *C04B 2235/3463* (2013.01); *C04B 2235/5292* (2013.01); *C04B 2235/5418* (2013.01); *C04B 2235/5427* (2013.01); *C04B 2235/72* (2013.01); *C04B 2235/94* (2013.01); *C04B 2235/95* (2013.01); *C04B 2235/9607* (2013.01)

(58) Field of Classification Search
CPC ......................... C04B 2235/3217; C04B 35/44
See application file for complete search history.

(56) References Cited

U.S. PATENT DOCUMENTS

2002/0095871 A1* 7/2002 McArdle .................. B24D 3/14
51/298

* cited by examiner

*Primary Examiner* — Alexandre F Ferre
(74) *Attorney, Agent, or Firm* — C. John Brannon; Brannon Sowers & Cracraft PC

(57) ABSTRACT

A high strength ceramic body for use in a regenerative burner media bed, comprising a generally spherical refractory portion and a plurality of irregular aggregate portions distributed randomly throughout the generally spherical portion. The aggregate portions are selected from the group comprising tabular alumina, white fused alumina, mullite, chamotte, and combinations thereof. The generally spherical portion has a porosity of less than 1 percent and is more than 99.5 weight percent alumina.

4 Claims, 3 Drawing Sheets

REGENERATIVE BURNER MEDIA

TECHNICAL FIELD

The claimed technology relates generally to ceramic materials and, more particularly, to crack-resistant spherical alumina media bed material for absorbing and releasing heat during sequential burner operation and/or regeneration cycles.

BACKGROUND

Regenerative burners are commonly used in molten aluminum, steel reheat, forging and glass furnaces. Regenerative burners typically include a pair of independently functioning burner units connected by a system of valves which allow each unit to alternately function as a burner and as a flue for the other unit when functioning as a burner. Cycle times between burner and flue functions may be as short as 30 seconds or so. The advantage of regenerative burners is that one unit captures the heat of the escaping flue gas of the other burner and uses the captured heat to warm a bed of thermal media which in turn pre-heats incoming combustion air, thus reducing fuel consumption as well as emissions.

However, as the burner units typically reach temperatures of 1500 degrees Fahrenheit of more during routine operation, and the incoming air is typically at ambient temperature, the rapid cycling of the bed media makes thermal shock damage to the media problematic. Further, heat recovery from the media is a function of the heat transfer, heat capacity, and effective surface area of the media. It is therefore advantageous for bed media to transfer heat quickly and efficiently to and from the surrounding gasses, and to otherwise resist and minimize damage from thermal shock, as well as to most efficiently use flue gas heat to preheat incoming air.

Thus, there is a need for inexpensive heat exchange media having good thermal mass, heat transfer properties, and mechanical stability that will resist degradation due to repetitive thermal cycling. The present novel technology addresses this need.

DESCRIPTION OF THE PREFERRED EMBODIMENTS

Figure 1:
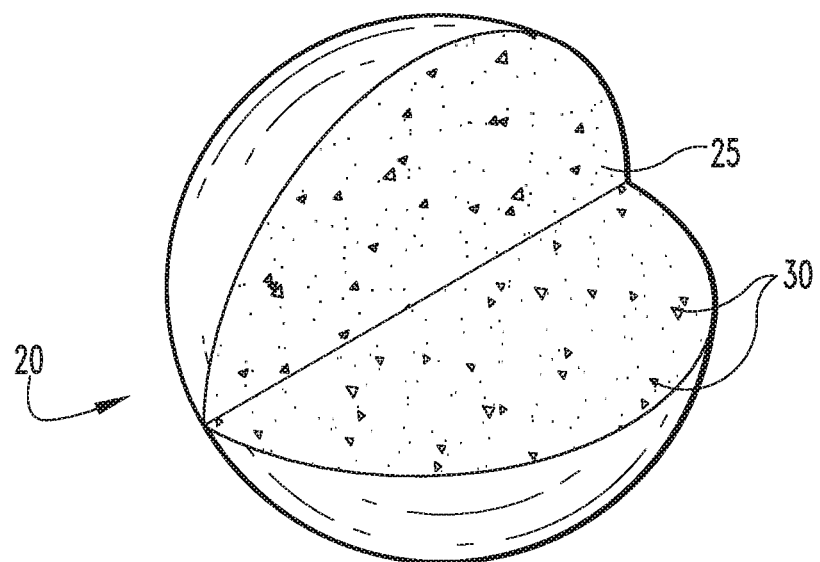
FIG. 1 is a partial cutaway perspective view of a first embodiment SPHERICAL regenerative burner body of the present novel technology.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

Figure 2:
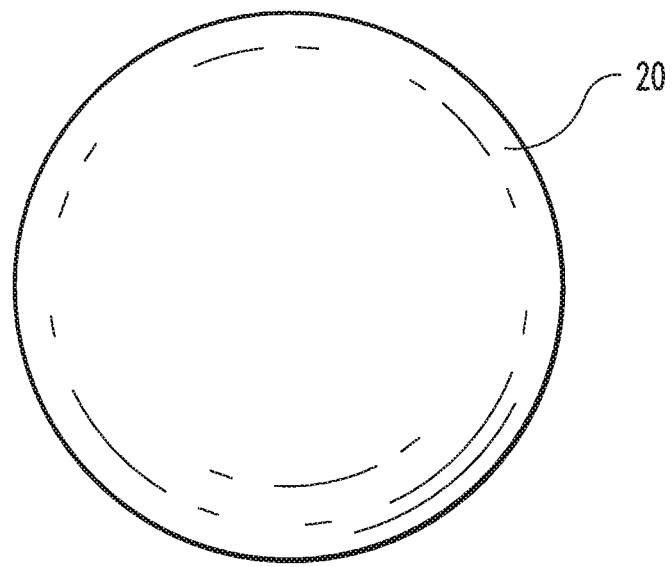
FIG. 2 is a perspective view of a second embodiment regenerative burner body of the present novel technology.
Figure 3:
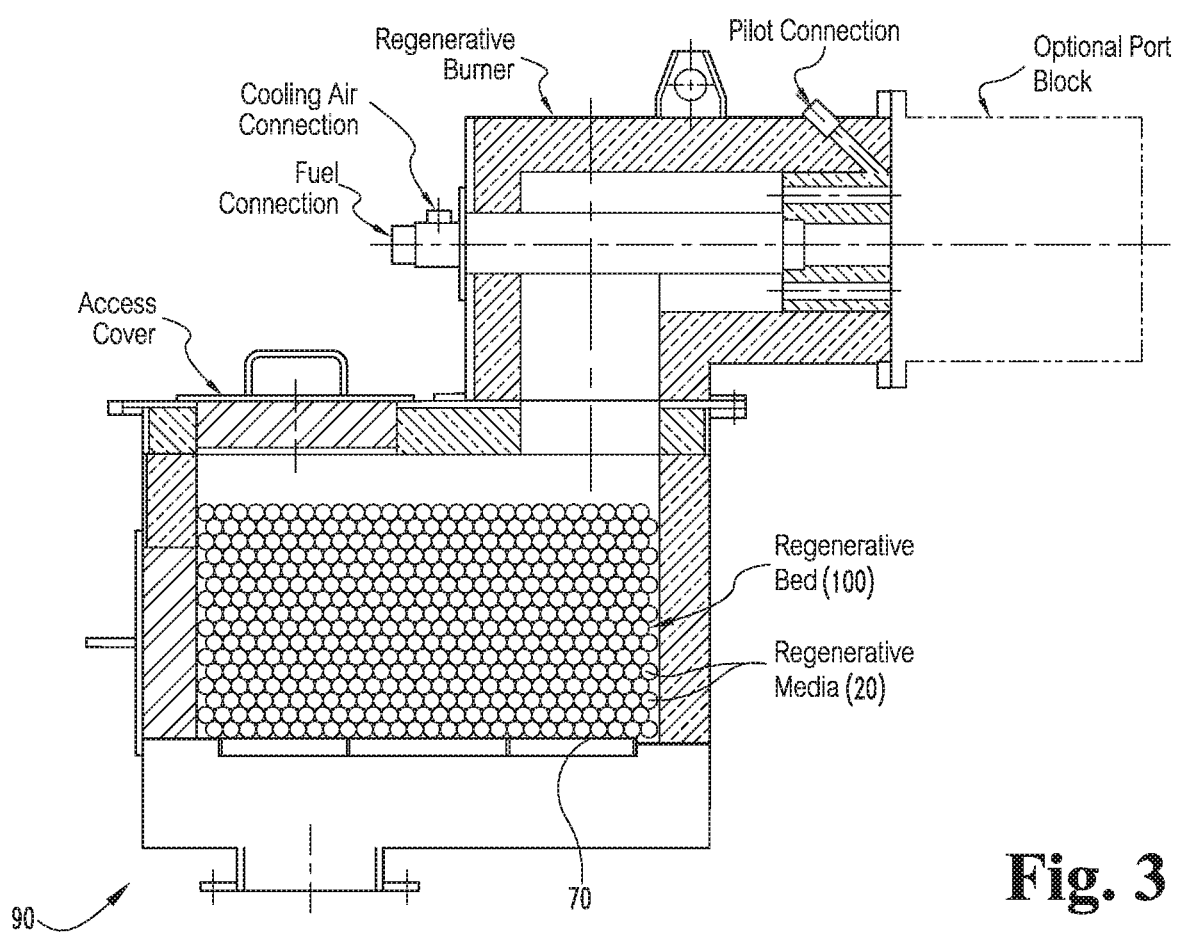
FIG. 3 schematically illustrates a regenerative burner system using the bodies of FIG. 1.
Figure 4:
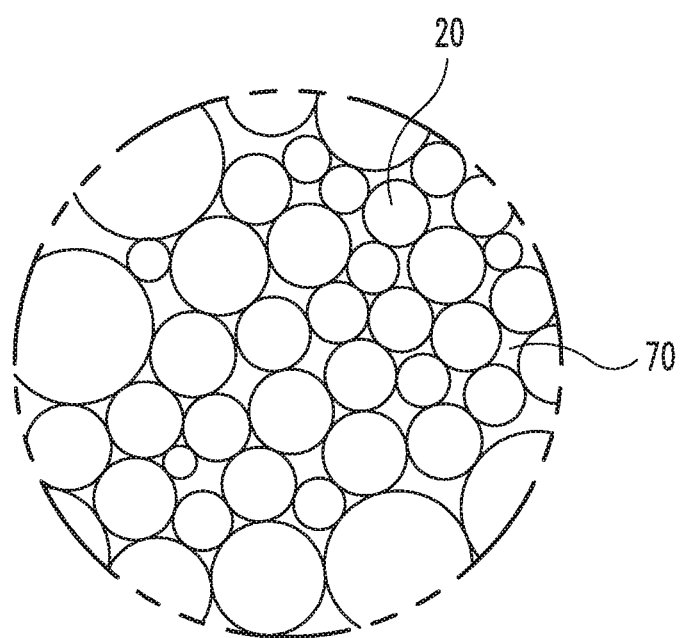
FIG. 4 is a schematic view of a plurality of intersecting bodies of FIG. 1.

As shown in FIGS. 1-4, the novel technology described and claimed herein relates to generally round or spherical (typically alumina) refractory media 20 for use as heat absorbing/heat releasing bed material in a regenerative burner system. In general, the novel technology is useful with regenerative burners having a dual burner design, wherein the hot exhaust from the currently active burner is directed onto media comprising the air inlet of the currently idle burner, so as to store otherwise wasted thermal energy in the media. While the examples discussed herein relate to spherical alumina media, other convenient shapes (such as cogs, prolate spheroids, disks, irregular shapes, or the like) and/or compositions (calcium aluminates, yttria stabilized zirconia, and the like) may be selected. When the active burner is idled and the idled burner is activated, inlet air is directed over the hot media to preheat the inlet air, and at least a portion of the hot exhaust of the now active burner is directed over media disposed in the inlet port of the now idled burner. The system includes generally round or spherical media 20 having an outer portion or matrix 25 composed of a typically high alumina refractory composition and containing one or more, typically a plurality, aggregate bodies 30, typically high (>99%) alumina, tabular alumina, white fused alumina, mullite, and/or chamotte, or the like. The aggregate bodies 30 act as crack-blunters. The aggregate bodies 30 are typically irregularly shaped and are typically randomly and/or homogeneously distributed throughout the alumina matrix 25. The aggregate bodies 30 typically make up between ten (10) and eight (80) weight percent of the media 20 composition, more typically between twenty (20) and sixty (60) percent of the compositions, and still more typically between thirty (30) and fifty (50) percent of the composition.

For example, one composition includes thirty (30) percent −5 mesh WFA aggregate. Other compositions may have up to fifty (50) percent or more aggregate. Other compositions utilize tabular alumina aggregate. As the size of the bodies is reduced, smaller bodies may require a different, typically smaller, aggregate size or a blend of two or more sizes of aggregate.

In some embodiments, the bodies are made of 37.5% calcined flint clay aggregate with the balance being stoneware (raw) clay. In other, typically larger body embodiments, the aggregate portion of the bodies comprises calcined flint sized to be 25%-20 mesh and 12.5%-200 mesh. In other, smaller body (such as ⅛" and ¼" diameter ball) embodiments, the aggregate portion is calcined flint sized to be 25%-200 mesh and 12.5%-20 mesh.

The media bodies 20 are typically sized to function as bed media in regenerative burners, and may have diameters of 9 mm, 11 mm, 19 mm, 25 mm, or the like. While typically spherical, the media bodies may have any convenient shape. For example, in some embodiments, the media bodies 20 are cog-shaped, wherein each cog-shaped body 20 includes a central, generally cylindrical portion from which a plurality of vanes or fin members extend.

Typically, the aggregate bodies 30 suspended in the matrix material 25 are small, typically about 5 mesh, but may have any convenient size. In some embodiments, larger particles (such as −20 mesh) are preferred, while in still other embodiments, larger particles are preferred.

The matrix portion 25 of the bodies 20 typically has a high alumina composition, typically in excess of 90 weight percent and sometimes as much as 99.5 weight percent alumina or more, with the remainder being between about 0.1 and about 0.5 weight percent silica, iron oxide, titania, calcia and/or soda, although other compositions may be selected. In some compositions, the alumina content may range from about 60 weight percent to 90 weight percent, with the remainder typically being silica with smaller amounts of other oxides, and in other compositions, the alumina content may be 30 weight percent or less. The matrix material typically has a fine grain size of around 1-3 microns, but may have any convenient grain size or grain size distribution.

The water absorption of the matrix portion 25 is typically about 1 weight percent or less, may typically be as great as about 3 weight percent. In some embodiments, the water absorption may be around 20 weight percent or more. Likewise, the porosity of the matrix portion 25 is typically below about 3 percent (density in excess of 97%), more typically below about 1 percent (density greater than 99%), still more typically below about 0.5 percent (density in excess of 99.5%), and yet more typically below about 0.1 percent (density greater than 99.9%). Low porosity/high density is typically desired for more efficient heat transfer. However, in some embodiments high porosity (greater than 3%, greater than 5% or more) may be desired to offset thermal shock/thermal expansion issues.

The bodies 20 typically have a relatively high heat capacity (about 0.21 cal/gm/° C. at 20° C.) and thermal conductivity (0.07 cal/sec cm ° C. at 100° C.), but also a relatively high thermal expansion coefficient. To minimize thermal shock damage, the bodies 20 are typically characterized with a very homogeneous microstructure, including a dispersed particulate phase 30 for retarding crack propagation.

In use, the bodies 20 are loaded into a burner 90 to define a regenerative bed 100. The media bodies 20 are typically of a single size, but alternately may be provided in a blend of sizes, or in layers. The respective bodies 20 remain generally spherical and rest against one another to define a contiguous network of air passageways 70 defining a predetermined minimum amount of void space so as to provide a reduced and controlled pressure drop across the bed 100. The voice space is generally a function of the sphere sizes, the distribution of the spheres 20, and the relative number of spheres 20 in each selected size. Upon introducing hot, flowing gas through the bed 100, the aggregate bodies 30 act to blunt or retard the propagation of cracks throughout the matrix portion 25 of a body 20 that may arise from nonuniform thermal expansion of the bodies 20 as they are heated by hot exhaust gas and/or cooled by inlet air.

Example 1

A spherical regenerative media body 20 was fabricated having a diameter of nineteen (19) millimeters, with thirty (30) weight percent 5 mesh aggregate particles 30, with the remainder being matrix 25 material. The aggregate 30 was white fused alumina, while the matrix 25 had the composition:

| | |
|---|---|
| $Al_2O_3$ | 99.0 wt. % |
| $SiO_2$ | 0.1 wt. % |
| $Fe_2O_3$ | 0.1 wt. % |
| $TiO_2$ | 0.4 wt. % |
| $Na_2O$ | 0.3 wt. % |
| CaO | 0.1 wt. % |

Example 2

A regenerative media body 20 was fabricated having a diameter of twenty-five (25) millimeters. The body 20 includes forty (40) weight percent 5 mesh mullite particles suspended in a matrix of:

| | |
|---|---|
| $Al_2O_3$ | 99.0 wt. % |
| $SiO_2$ | 0.2 wt. % |
| $Fe_2O_3$ | 0.1 wt. % |
| $TiO_2$ | 0.4 wt. % |
| $Na_2O$ | 0.2 wt. % |
| CaO | 0.1 wt. % |

Example 3

A regenerative media body 20 was fabricated having a diameter of eleven (11) millimeters. The regenerative body 20 includes thirty (30) weight percent 5 mesh tabular alumina particles homogeneously distributed throughout the matrix 25 and fifteen (15) weight percent 5 mesh mullite particles 30 evenly distributed throughout the matrix 25. The composition of the matrix 20 was:

| | |
|---|---|
| $Al_2O_3$ | 99.5 wt. % |
| $SiO_2$ | 0.10 wt. % |
| $Fe_2O_3$ | 0.05 wt. % |
| $TiO_2$ | 0.15 wt. % |
| $Na_2O$ | 0.15 wt. % |
| CaO | 0.05 wt. % |

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

I claim:
1. A sintered, generally spherical ceramic body, comprising:
    a generally spherical alumina portion defining a matrix; and
    a plurality of aggregate bodies distributed throughout the matrix;
    wherein the aggregate bodies are made of a material selected from the group comprising tabular alumina, white fused alumina, mullite, chamotte and combinations thereof;
    wherein the respective aggregate bodies are no more than 5 mesh in diameter;
    wherein the matrix has a porosity of less than 3 percent;
    wherein the matrix has a silica content of between about 0.1 and 0.3 weight percent distributed substantially homogeneously therethroughout;
    wherein the matrix has a titania content of between about 0.1 and 0.5 weight percent distributed substantially homogeneously therethroughout;

wherein the matrix has a calcia content of between about 0.05 and 0.2 weight percent distributed substantially homogeneously therethroughout;

wherein the matrix has a soda content of between about 0.1 and 0.5 weight percent distributed substantially homogeneously therethroughout;

wherein the matrix has an iron oxide content of between about 0.05 and 0.2 weight percent distributed substantially homogeneously therethroughout; and wherein the balance of the matrix is alumina.

2. A high strength ceramic body for use in a regenerative burner media bed, comprising a generally spherical refractory portion and a plurality of irregular aggregate portions distributed randomly throughout the generally spherical portion; wherein the aggregate portions are selected from the group comprising tabular alumina, white fused alumina, mullite, chamotte, and combinations thereof; wherein the generally spherical portion has a porosity of less than 5 percent; wherein the generally spherical portion is greater than 99.5 weight percent alumina; wherein the generally spherical portion has a thermal conductivity at 100° C. of about 0.07 cal/sec cm ° C.; wherein the generally spherical portion has a heat capacity of about 0.21 cal/gm/° C.; and wherein the generally spherical refractory portion has a formula comprising:

| | |
|---|---|
| $Al_2O_3$: | 99.5 wt. % |
| $SiO_2$: | 0.10 wt. % |
| $Fe_2O_3$: | 0.05 wt. % |
| $TiO_2$: | 0.15 wt. % |
| $Na_2O$: | 0.15 wt. % |
| CaO: | 0.05 wt. %. |

3. A high strength ceramic body for use in a regenerative burner media bed, comprising a generally spherical refractory portion and a plurality of irregular aggregate portions distributed randomly throughout the generally spherical portion; wherein the aggregate portions are selected from the group comprising tabular alumina, white fused alumina, mullite, chamotte, and combinations thereof; wherein the generally spherical portion has a porosity of less than 5 percent; wherein the generally spherical portion is greater than 99.5 weight percent alumina; wherein the generally spherical portion has a thermal conductivity at 100° C. of about 0.07 cal/sec cm ° C.; wherein the generally spherical portion has a heat capacity of about 0.21 cal/gm/° C.; and wherein the generally spherical refractory portion has a formula comprising:

| | |
|---|---|
| $Al_2O_3$ | 99.0 wt. % |
| $SiO_2$ | 0.2 wt. % |
| $Fe_2O_3$ | 0.1 wt. % |
| $TiO_2$ | 0.4 wt. % |
| $Na_2O$ | 0.2 wt. % |
| CaO | 0.1 wt. %. |

4. A high strength ceramic body for use in a regenerative burner media bed, comprising a generally spherical refractory portion and a plurality of irregular aggregate portions distributed randomly throughout the generally spherical portion; wherein the aggregate portions are selected from the group comprising tabular alumina, white fused alumina, mullite, chamotte, and combinations thereof; wherein the generally spherical portion has a porosity of less than 5 percent; wherein the generally spherical portion is greater than 99.5 weight percent alumina; wherein the generally spherical portion has a thermal conductivity at 100° C. of about 0.07 cal/sec cm ° C.; wherein the generally spherical portion has a heat capacity of about 0.21 cal/gm/° C.; and wherein the generally spherical refractory portion has a formula comprising:

| | |
|---|---|
| $Al_2O_3$ | 99.0 wt. % |
| $SiO_2$ | 0.1 wt. % |
| $Fe_2O_3$ | 0.1 wt. % |
| $TiO_2$ | 0.4 wt. % |
| $Na_2O$ | 0.3 wt. % |
| CaO | 0.1 wt. %. |

* * * * *